United States Patent
Menig et al.

[11] Patent Number: 6,151,977
[45] Date of Patent: Nov. 28, 2000

[54] LEVER ASSEMBLY FOR AN ELECTRONICALLY CONTROLLABLE VEHICLE TRANSMISSION

[75] Inventors: Paul Menig, Tigard; Michael von Mayenburg; Nasser Zamani, both of Lake Oswego; Joseph Loczi; Jason Stanford, both of Portland, all of Oreg.

[73] Assignee: Freightliner Corporation, Portland, Oreg.

[21] Appl. No.: 09/258,649

[22] Filed: Feb. 26, 1999

[51] Int. Cl.[7] .................................................. F16H 59/04
[52] U.S. Cl. ..................... 74/336 R; 74/473.12; 74/473.18
[58] Field of Search .................. 74/335, 336 R, 74/473.12, 473.18, DIG. 7; 340/456

[56] References Cited

U.S. PATENT DOCUMENTS

| | | | |
|---|---|---|---|
| 4,966,044 | 10/1990 | Bowman et al. | 74/335 |
| 5,459,658 | 10/1995 | Morey et al. | 74/335 |
| 5,816,100 | 10/1998 | Fowler et al. . | |
| 5,865,705 | 2/1999 | Shamoto et al. | 74/335 |

OTHER PUBLICATIONS

"Eaton® Fuller® Automated Transmissions" brochure dated Mar. 1995.
Fleet Owner® "Smart Transmissions, Fleets Shift into the Future", Dec. 1996.
Commercial Carrier Journal, Apr. 1997; "Spicer to Offer Full Automation" and "AutoShift—It's Not Just for Buses Anymore".
Automotive Engineering, Article entitled; "Global Viewpoints", Jan. 1997, six pages.
Commercial Motor, "Volvo FL10 Geartronic—Easy Does It"; Jun. 1993.
Advertisement, "The Shortest Distance Between Two Shift Points is Now a Straight Line", Jun. 1995.
"Bedienungsanleitung Geartronic", Volvo Truck Corporation manual, German Language, 1993.

Primary Examiner—Dirk Wright
Attorney, Agent, or Firm—Klarquist Sparkman Campbell Leigh & Whinston LLP

[57] ABSTRACT

An electronic shift control lever assembly that transmits signal indicating a driver's desired gear selection to a variety of types of vehicle's transmissions in one form includes a steering column mounted shift lever. The shift lever is actuatable by the driver to signal a gear selection.

26 Claims, 10 Drawing Sheets

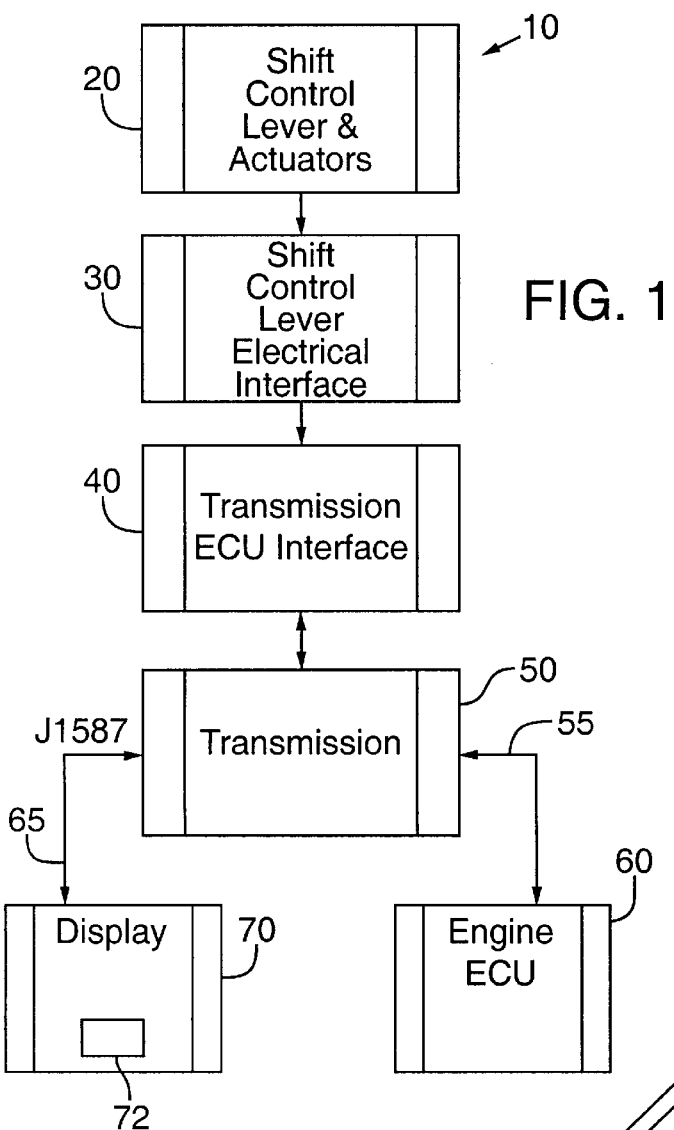
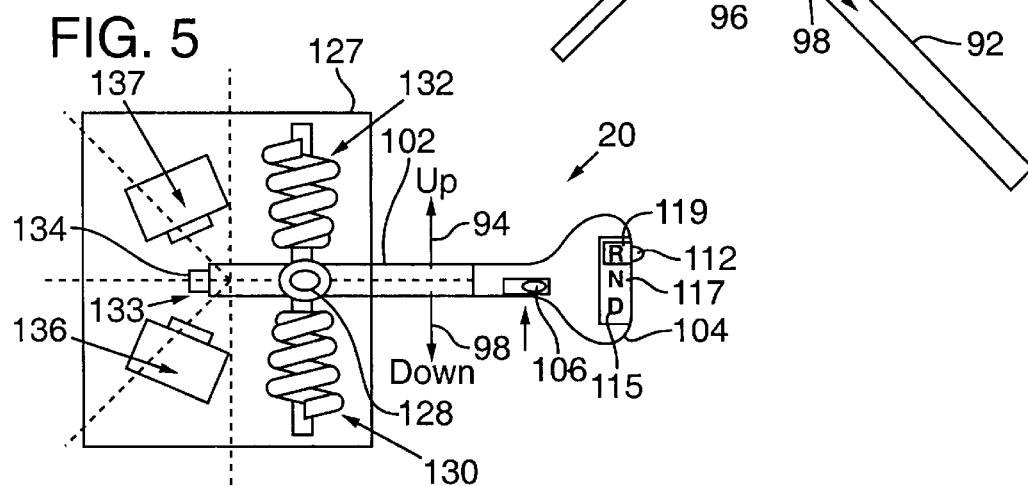

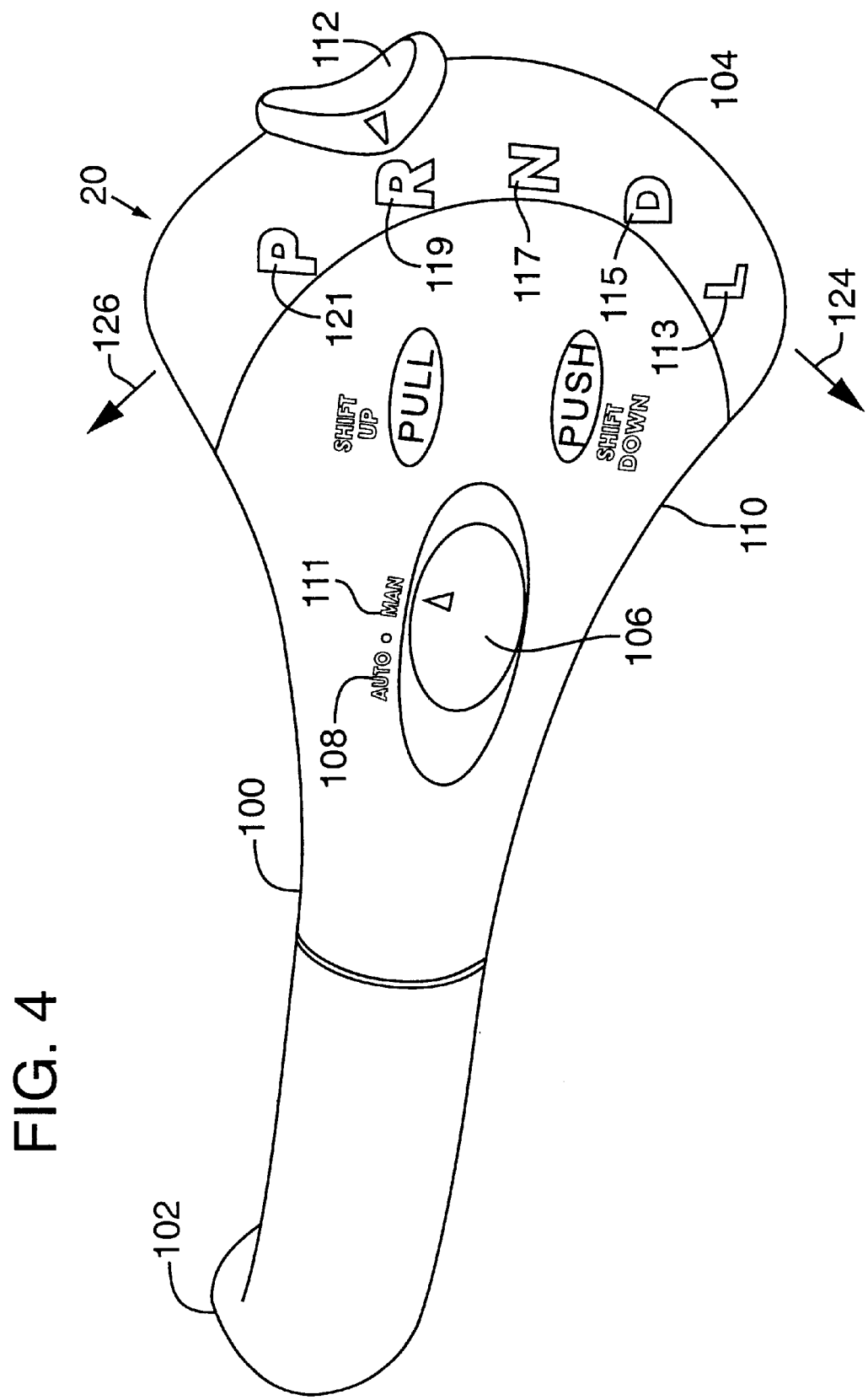

LEVER ASSEMBLY FOR AN ELECTRONICALLY CONTROLLABLE VEHICLE TRANSMISSION

BACKGROUND

The present invention relates to transmission control devices for vehicles.

Electronic transmission control devices for automatic transmissions and automated mechanical transmissions, collectively referred to as automated transmissions, are known. Fully automatic transmissions automatically shift between gears, typically using pressurized fluid to engage several drive members together by friction to achieve a selected gear ratio. In automated mechanical transmissions, electronic, hydraulic and/or pneumatic actuation is used to engage and disengage mechanical clutches to achieve a desired gear ratio. In some automated mechanical transmissions, the driver must manually engage the clutch when starting the vehicle from a stopped position or when coming to a stop.

In many modern automated transmissions, a transmission control device is electronically connected to the transmission, and particularly, to a transmission ECU (electronic control unit). When a driver actuates the transmission control device, such as a floor mounted shift lever, the driver's desired action is evaluated by the transmission ECU and then performed if within the range of acceptable actions for the current conditions. For example, a typical transmission control device may allow a driver to (a) select a transmission mode setting (e.g., "Park," "Drive", "Neutral," and "Reverse"); (b) upshift/downshift manually while a particular mode setting is selected (e.g., to upshift/downshift between the various ratios available when the forward "Drive" mode is selected); and/or (c) to disable this manual upshift/downshift functionality. As one example, the driver's attempt to select the Reverse gear setting while the vehicle is moving forward may be prevented by the transmission ECU logic if the speed of the vehicle is above a predetermined limit.

In known automated transmission systems, the electronic transmission control device is typically a floor mounted lever and/or a button. It is common for the lever to be mounted to the floor in the cab of the vehicle, similar to the positioning of a shift lever for a conventional manual transmission. Alternatively, some transmission control devices are mounted to the dashboard of the vehicle. These devices may include one or more push buttons for actuating one or more functions.

SUMMARY

The present invention is directed toward automated mechanical transmissions with novel and unobvious features as set forth herein, individually as well as in various combinations with one another.

For ease of operation, it would be desirable to provide an integrated electronic transmission control device allowing the driver to exert fingertip control in selecting the transmission mode and the current gear setting, and in executing upshifts/downshifts. It is also desirable to provide such controls at a single location within a vehicle driver's reach while the driver's hands remain on the steering wheel and the driver's attention is focused forwardly. It would also be advantageous to eliminate a floor-mounted shift lever to conserve space within the cab of the vehicle.

In accordance with one embodiment, an electronic transmission control device includes a shift control lever assembly that transmits signals indicating a driver's desired gear selection to a transmission of a vehicle. The shift control lever assembly in one embodiment includes an elongated lever section or member projecting outwardly away from the steering column of the vehicle. According to one aspect of this embodiment, the lever member is actuatable to signal a gear selection.

The lever member may have a first end portion coupled to the steering column and a second distal end portion supported within reach of a driver's fingertips while the driver's hands are in contact with the steering wheel. The first end portion of the member may be pivotably coupled to the steering column. The lever member may be mounted to pivot toward the driver to signal an upshift, and away from the driver to signal a downshift.

The shift control lever may also include a selector that faces the driver, the selector being actuatable by the driver to select between an automatic shift mode and a manual shift mode and/or between a normal mode and a power take-off mode. In addition, the shift control lever may also include a mode control selector, for example, a switch slidable along the distal end of the second end portion of the lever member, for use in selecting the mode of operation of the transmission (e.g. Park, Reverse, Drive, Neutral).

A transmission controller, responsive to the shift control lever, causes the shifting of the gears of the vehicle in accordance with shift control logic included in the transmission controller.

Various individual and collective novel and unobvious features of novelty that characterize the invention are particularized in the claims forming a part hereof. For a better understanding of the invention, however, refer to the drawings and accompanying description in which a number of embodiments of the invention are illustrated.

BRIEF DESCRIPTION OF THE DRAWINGS

FIG. 1 is a block diagram of an overall automated transmission system with one form of a shift control lever assembly in accordance with the present invention.

FIG. 3 is a schematic side view of a form of shift control lever member as installed on a steering column of the vehicle.

FIG. 4 is a perspective view of a further embodiment of the shift control lever member.

FIG. 5 schematically illustrates one approach for coupling the shift control lever member to the vehicle steering column.

DETAILED DESCRIPTION

Figure 2:
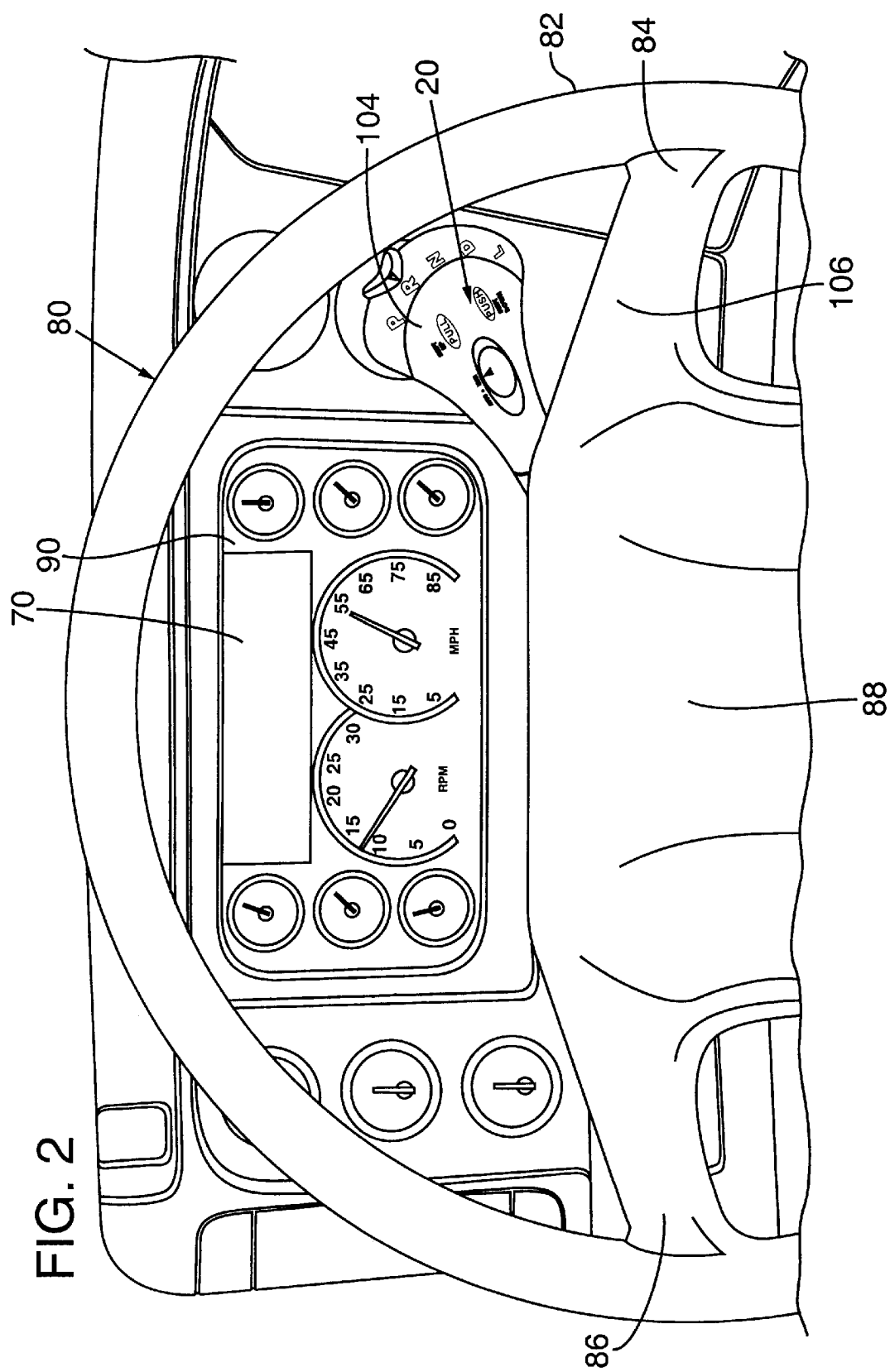
FIG. 2 is a drawing showing one form of a shift control lever member in its relation to a steering wheel and a dashboard of a vehicle.

FIG. 1. shows one example of an overall automated transmission system 10 having a transmission control device or shift control lever 20 connected to a transmission ECU (electronic control unit) 50 through a shift control lever electrical interface 30 and a transmission ECU interface 40. The shift control lever electrical interface 30 and transmission ECU interface may be included with the shift control lever 20 in a shift control lever assembly. The transmission ECU 50 may be part of the transmission. The transmission ECU 50 is connected to an engine ECU 60 by a link 55 over which data is exchanged between the transmission ECU 50 and the engine ECU 60.

Optionally, the automated transmission system 10 may include a display 70, which may be connected to at least the transmission ECU 50 by a link 65, such as a standard SAE J1587 data bus. The display 70 may be a separate dedicated display that shows transmission information (e.g., selected gear, mode, gear upshift or downshift desirable, etc.), or part of an information display used for other purposes as well (e.g., to provide information on vehicle speed, cruise control, collision warning, fuel consumption, operating temperature/pressure, etc.). The display 70 may be mounted on the dashboard of the vehicle or in any other suitable location within the driver's view. The display 70 may include an audio signaling device 72 that emits audible signals to warn the driver of the occurrence of selected predetermined circumstances.

The shift control lever 20 and the shift control lever electrical interface 30 are designed to be easily adapted for use with various different transmissions. Therefore, the shift control lever electrical interface 30 can be configured to interact with the transmission ECU interface 40 of any particular suitable transmission without extensive modification.

For example, the transmission ECU interface 40 and transmission 50 may be an Eaton autoshift transmission produced by Eaton Corporation, with the transmission ECU interface 40 programmed to carry out transmission functions in response to signals from the shift control lever and lever electrical interface. The Eaton autoshift transmission has automatic and manual modes of operation. When in the automatic mode, the transmission takes care of shifting between gears without driver input, at least after the initial gear is selected by the driver. In the manual mode, in general, gear selection is accomplished by the driver operating an upshift or downshift button or other actuator. The Eaton autoshift also permits skip shifting. By skip shifting, it is meant that one or more gears may be shifted during upshifting and downshifting operations, at least under certain vehicle operating conditions. Other specific transmissions and transmission ECU's include the Meritor sureshift transmission; the Allison MD/HD transmission; Transmission Technologies Corporation transmissions; and Daimler-Benz transmissions. In particular, these transmissions are of the automated mechanical transmission type in the sense that they are responsive to input electrical signals transmitted to the transmission. The electronic shift control lever assembly of FIG. 10, at least when in a manual operating mode, accepts driver requests for transmission operations and transmits this requested information to the vendor supplied transmission control unit or ECU interface 40 and hence to the transmission 50. In one specific embodiment, an electronic shift control lever assembly 10 is provided which may be used with a wide variety of transmissions.

FIGS. 2–4 show one embodiment of a shift control lever 20. FIG. 2 shows the shift control lever 20 in its relation to a steering wheel 80 and a dashboard 90 of a typical vehicle. As shown, the shift control lever 20 extends outwardly from the right side of a steering column 92 in the area between the steering wheel 80 and the dashboard 90, similar to other stalk-mounted automobile controls (e.g., for lights, windshield wipers, turn signals, cruise control settings, etc.). Lever 20 may extend outwardly from the left side of the steering wheel column, if desired (for example, for a vehicle with the steering wheel on the opposite side of the cab from the FIG. 2. illustration).

Referring to FIG. 4, the illustrated shift control lever 20 has a body 100, a steering column coupling end portion 102 and a free or distal end portion 104. The steering column coupling end portion 102 is coupled to the steering column 92, such as explained below in connection with FIG. 7. In the embodiment shown in FIG. 2, the steering wheel 80 has a steering wheel rim 82, a three o'clock spoke 84, a six o'clock spoke 86 and a steering wheel hub 88 where the three o'clock spoke 84 joins the six o'clock spoke 86. As shown in FIG. 2, the outer end portion 104 of the shift control lever 20 is preferably positioned to be visible to the driver (with the steering wheel 80 in its neutral position) through an opening in the steering wheel. In this case, the end portion 104, and, more specifically, a surface thereof which faces the driver, is visible through the steering wheel opening. Of course, other suitable mounting positions may be used.

Thus, the shift control lever 20 is within nominal fingertip reach of the driver's right hand while the driver's right hand is on the steering wheel rim 82. As a result, any of the controls on the shift control lever 20 may be conveniently actuated by the driver. Also, the optional display 70 is visible through the opening between the steering wheel rim 82 and the steering wheel hub 88.

Although the outermost end of the lever 20 may extend radially outwardly beyond the steering wheel rim 82, in the illustrated embodiment the end of the lever terminates radially inwardly (for example, about five millimeters inwardly) from the steering wheel rim. Also, although variable, for easy access by the fingertips of a driver, the lever is typically positioned relatively close to the steering wheel. As a specific example, the lever may be spaced about sixty millimeters from the dashboard side of the steering wheel rim and about eighty millimeters from the dashboard. Sufficient space is allowed to permit operation of the lever. For example, in an illustrated embodiment, the lever is pulled toward the driver, thus toward the plane containing the steering wheel, to cause shifting of the transmission in one direction. The lever in this embodiment is pushed away from the steering wheel plane and from the driver to cause shifting of the transmission in the opposite direction. Enough space is provided between the steering wheel and lever to accommodate this shifting motion as well as between the lever and the instrument panel on the dash for lever shifting in the opposite direction. In the specifically illustrated example, although this may be varied, pulling the lever toward the steering wheel signals a desired upshift in gears from one gear ratio to a higher gear ratio. Conversely, pushing the lever away from the driver signals a desired downshift in gear ratio.

As shown in FIGS. 3 and 4, the controls on the illustrated shift control lever 20 include (1) a manual/automatic and/or normal/power takeoff selector, such as a slide switch 106; (2) a mode selector such as a slide switch 112; and (3) an upshift/downshift function. The illustrated switch 106 is optional and typically is included when the particular transmission has features to be controlled by the switch. The switch 106 shown in FIG. 4 is positioned on the body 110 of the shift lever between the steering column coupling end portion 102 of the lever 20 and the outer end portion 104. As shown, the illustrated switch 106 is a slide switch with a first position 108 and a second position 111, although more than one such switch may be included and a switch with three or more positions may be used, depending upon the particular operating requirements.

The illustrated switch 106 is positioned on the surface of the lever body 10 which is visible through the steering wheel (see FIG. 2). Visual indicia, such as explained below, on surface 110 indicate the position of the switch to the driver. Switch 106 may thus be positioned where it is reachable by the driver without the driver removing his or her hands from the steering wheel.

In the illustrated embodiment, the switch 106 is operated to select automatic shifting operation or manual shifting operation. Thus, the first position 108 is labeled "AUTO" and the second position 111 is labeled "MAN." In automatic shifting operation, gear changes may occur without driver intervention. In addition, shifting may be responsive to lever controlled upshift/downshift motions. In manual shifting operation, the driver may exert at least some control over when to shift between different gears in the forward drive and, in some embodiments, reverse gear settings. In FIG. 4, the switch 106 is shown in the second position 111, indicating that manual shifting operation has been selected. The switch 106 may be designed to require sufficient actuation force (e.g., 0.5 pounds, although this may be varied) to ensure that movement of the switch 106 is intended, but such movement is still conveniently executed by the driver.

Automatic and manual shifting operation are described below in greater detail. In another embodiment, the switch 106 is configured to allow the driver to select between normal operation and power takeoff operation.

The illustrated mode selector, in this case, switch 112, is slidable between a plurality of mode select positions. More specifically, in the form shown in FIG. 4, the outer end of end portion 104 is arcuate. The switch 112 moves in an arcuate path along this end. Visual indicia, on the surface 110 of the lever which is visible to the driver, may be provided to indicate the selected mode. In FIG. 4, the switch 112 may be moved along an approximately semicircular path between positions 113, 115, 117, 119 and 121 in a counterclockwise direction denoted by an arrow 122 (in this figure) and in a clockwise direction denoted by an arrow 124 in the opposite direction between these positions. Each of the positions 113 through 121 corresponds to a transmission mode setting that can be selected by the driver. In the illustrated embodiment, five positions 113–121 are used, corresponding to gear settings for Park (P), Reverse (R), Neutral (N), Drive (D) normal or high, and Drive Low (L) as shown. Alternatively, a different number of positions may be provided depending upon the particular operating requirements. For example, the gear settings might be R, N and D (see FIG. 3) or L, D, N, R and P. Each of the positions 113–121 is preferably detented to ensure positive engagement.

Thus, the driver may actuate the mode selector switch 112, which, in FIG. 4, shows the switch in the Reverse (R) mode setting, by moving the selector switch 112 in the counterclockwise direction 122, such as to the Park (P) position, or in the clockwise direction 124, such as to the Neutral (N) position. The selector switch 112 is shaped for fingertip control, particularly for use by the driver's thumb while the driver holds the outer or distal lever end 104 with one or more of the driver's other fingers. Although variable, the selector switch may be designed to operate upon the application of about one pound of force. The shift control lever 20 may include mechanical or electronic features to prevent certain undesirable gear setting changes, e.g., from a forward Drive gear setting to a Reverse setting at high speed. The control may also prevent the engagement of the Neutral drive setting (except under acceptable conditions, such as the vehicle being operated at less than an acceptable speed, with five miles per hour being one specific example).

Referring to FIG. 3, the upshift/downshift functionality is achieved by moving the lever to first and second positions from a home position. In the illustrated embodiment, the distal end 104 of the shift control lever 20 may shift from a spring-based neutral or home position 96 (see FIG. 3) in a positive Z axis direction 94 or a negative Z axis direction 98. The position of the lever is detected and causes the transmission of a gear shift control signal to the transmission ECU. In this example, when the driver momentarily pivots the shift control lever 20 towards himself to one position, the transmission upshifts by one gear. Conversely, when the driver momentarily pivots the shift control lever 20 away from himself, the transmission downshifts by one gear.

Skip shifts, i.e., shifts in which the transmission is moved directly from the current gear to another nonsequential gear, may be performed. For example, skip shifting may be caused to occur by moving the shift control lever 20 multiple times from the home position in one of the directions in less than a predetermined time interval. For example, if the driver pivots the shift control lever 20 toward himself three times during a predetermined interval, the transmission will be upshifted from the current gear (e.g., fourth gear) by three gears (i.e., to seventh gear). Other shift lever operations may be used to indicate skip shifting is desired. Skip shifting need not be permitted, although this option is conventional.

With reference to FIG. 5, the shift lever 20 extends into a housing 127 and is pivotally supported within the housing by pivot 128 for, in this case, upward and downward pivoting movement as indicated by arrows 94, 98. Housing 127 may in turn be supported by a bracket or otherwise connected to the steering column to thereby couple the lever 20 to the steering column. The lever may be biased to a neutral position between the upshift and downshift indicating positions. Return springs 130, 132 are indicated for this purpose. Springs 130, 132 need not apply the same spring preload. Although variable, in one specific example, about 1.3 pounds of resistance is provided against downshifting operations and about 2.2 pounds of resistance is provided against upshifting operations. The innermost end portion 133 of lever 20, spaced in this case on the opposite side of pivot 128 from outer end portion 104, carries a switch actuator 134. In an upshifting operation, switch actuator 134 activates switch 136 resulting in an upshift signal being sent to the transmission ECU. In response to a downshifting operation of lever 20, switch actuator 134 causes switch 137 to operate and deliver a downshift signal to the transmission ECU. Switches 136, 137 may be of any convenient type with reed switches being a specific example.

Figure 6:
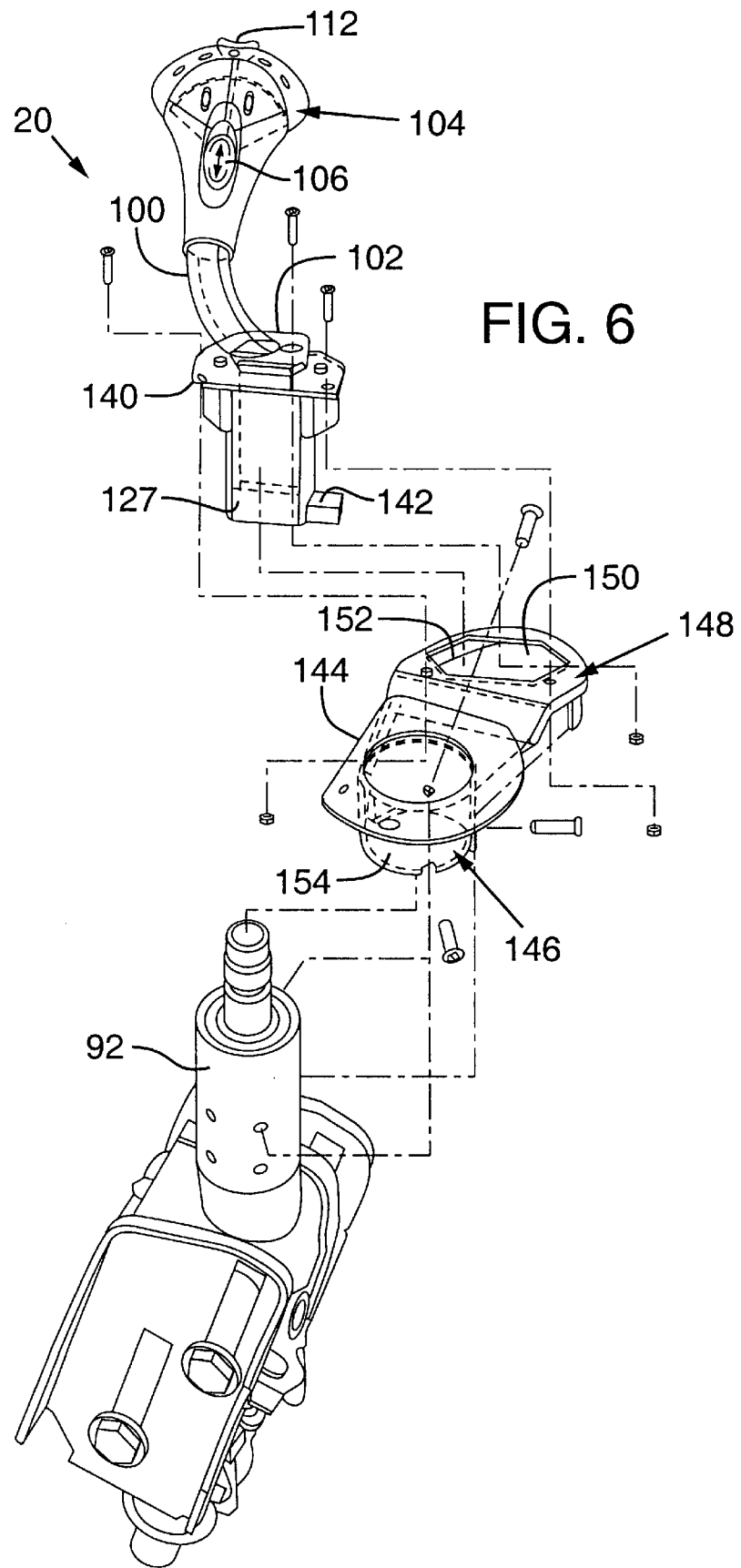
FIG. 6 illustrates an additional form of shift control lever assembly.

FIG. 6 illustrates a form of lever assembly 20 shown pivoted to a housing 127 of a rectangular, box-like construction. Housing 127 may assume other configurations, but is typically hollow and sealed with reed switches and other electrical circuitry included in the shift lever assembly being contained therein. The illustrated housing 127 includes a bracket engaging flange 140. In addition, an electrical connection block or connector 142, which may be a plug-in type receptacle, is carried by housing 127. Electrical conductors, not shown, may be connected to connector 142 for coupling the circuitry to the transmission electronic control unit 40 (FIG. 1) or to other suitable cabling for delivering signals from the shift lever control assembly to the transmission.

The electronic shift control assembly may be mounted directly to the steering column. However, in the FIG. 6 embodiment, a mounting bracket, one form being indicated at 144, is included for this purpose. The illustrated mounting bracket 144 includes a base portion 146 and a lever carrying or supporting portion 148. Base portion 146 is coupled to the steering column 92. In the specific form shown, base portion 146 includes a collar 154 through which the steering column 92 is inserted, with the collar surrounding the entire perimeter of the steering column. Fasteners, not numbered in FIG. 6, may be utilized to secure the collar to the steering column. The shift control lever carrying portion 148 projects outwardly from the base 146. The FIG. 6 carrier 148 includes a lever support portion, such as a flange 152. The illustrated flange 152 has an upper surface in a plane which is generally parallel to the plane of the steering wheel. An opening 150 is provided through flange portion 152 through which the housing 127 is inserted. The undersurface of flange 140 engages the upper surface of support flange 152 when the assembly is installed. Fasteners, not numbered in FIG. 6, may be used to connect flange 140 to support 152 to thereby anchor the assembly in place. The illustrated construction rigidly and securely couples the shift control lever assembly 20 to the steering wheel column.

The transmission ECU may be programmed to respond to signals from the shift control lever assembly in numerous ways. The existing Eaton autoshift, Meritor sureshift, and Allison MD/HD mechanical automated transmissions contain examples of this control logic. FIGS. 7–11 illustrate one suitable logic approach. However, it should be noted that the shift control assembly is not limited to any specific logic approach.

Figure 7:
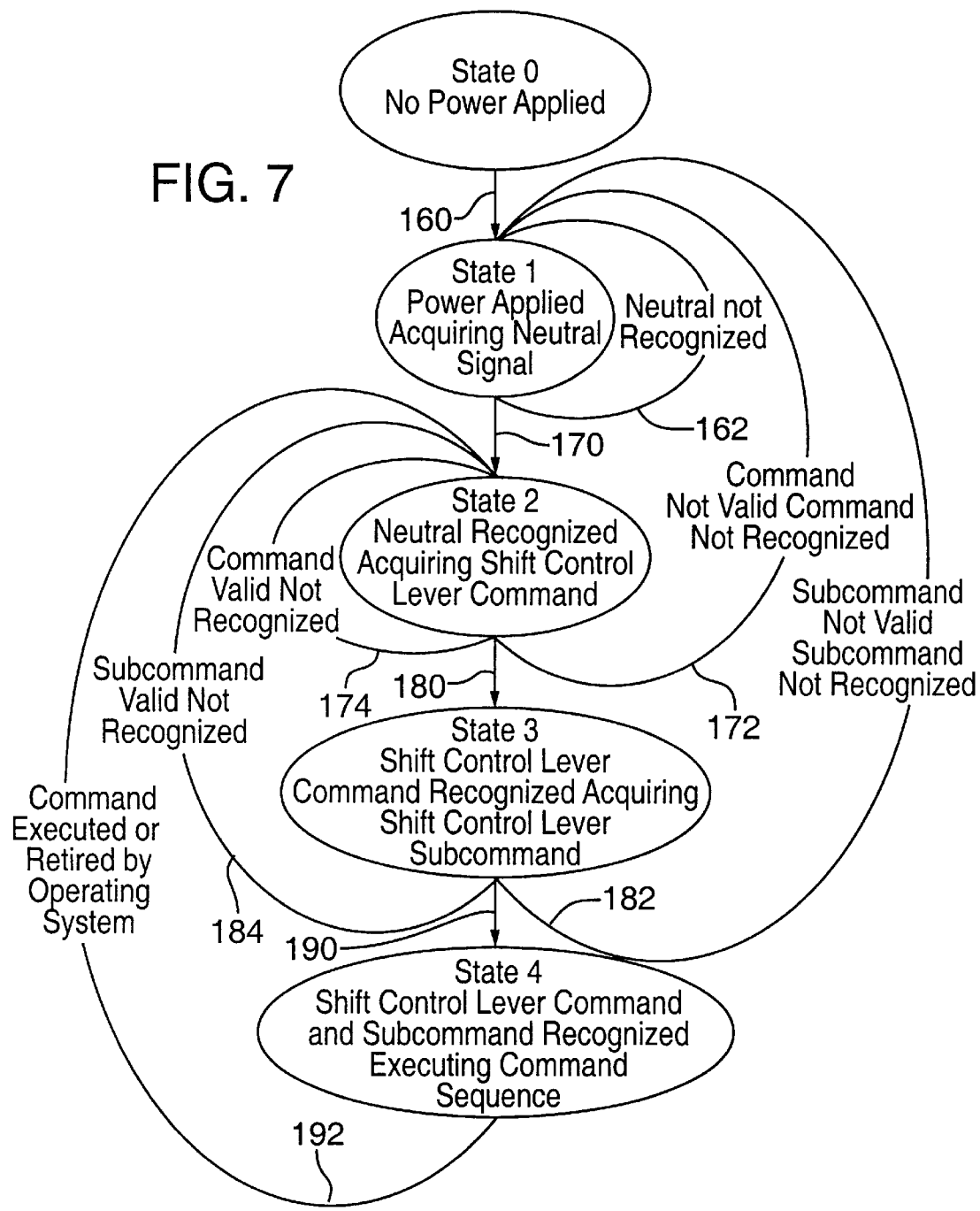
FIG. 7 is a state logic diagram showing various states of operation for one embodiment of the shift control lever assembly.

FIG. 7 is a state logic diagram showing the various states of operation for one example transmission ECU interface 40 (FIG. 1). FIG. 7 shows five such states: State 0, State 1, State 2, State 3 and State 4. State 0 is the "off" state in which no power is applied to any of the controls of the shift control lever 20.

When a control function is requested, a program stored in the transmission ECU 40 advances the operation to State 1. In State 1, power is applied to one or more inputs of a circuit included in the shift control lever 20, and it is determined whether the transmission is in the Neutral gear setting by attempting to acquire a neutral signal. As shown by a branch 162, the operation remains in State 1 if the neutral signal is not recognized.

If the neutral signal is recognized, the program advances to State 2 as indicated by an arrow 170. In State 2, a shift control lever command is acquired. In a branch 172, the program is returned to State 1 if the command is not valid and not recognized. If the command is valid but not recognized, the operation remains in State 2 as indicated by the branch 174.

If the command is valid and is recognized, the program advances to State 3. In State 3, a shift lever subcommand is acquired. If the subcommand is not valid and not recognized, the program returns the operation to State 1 as indicated by a branch 182. If the subcommand is valid, but not recognized, the program returns the operation to State 2 as indicated by a branch 184.

If the subcommand is valid and recognized, the program advances to State 4. In State 4, the command sequence dictated by the command and the subcommand are executed. After the command sequence is executed or retired, the program returns to State 2 as indicated by a branch 192.

FIGS. 8–11 are flow charts showing the steps executed by the transmission ECU 40 (hereinafter the controller) in the control processes occurring between the various states of operation of this example.

Figure 8:
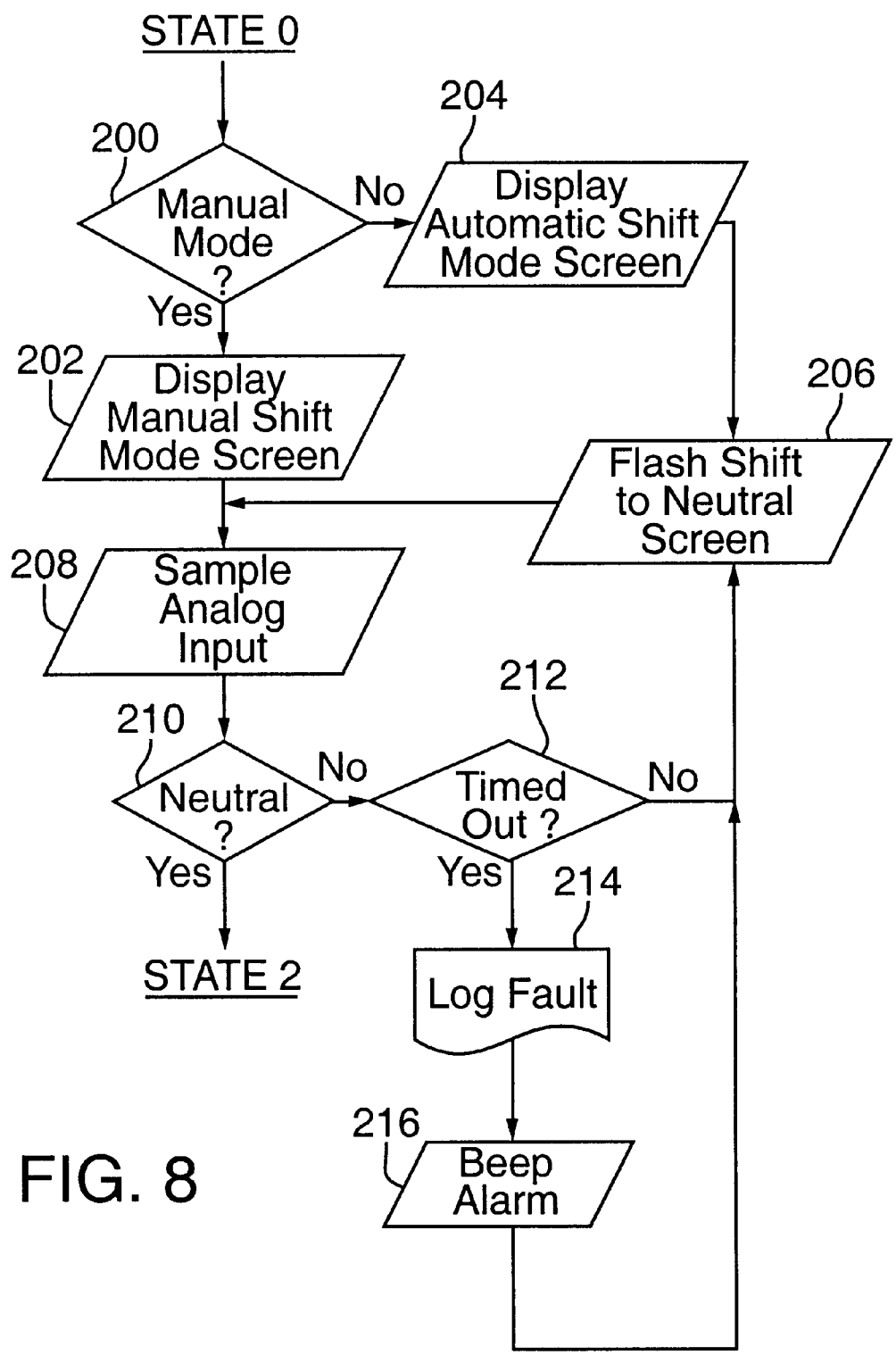
FIGS. 8, 9, 10 and 11 are flow charts showing examples of the steps executed by a transmission in response to shift control lever positions of one form of a shift control lever assembly.

In FIG. 8, the operation of the system is initially in State 0. In step 200, the controller determines whether manual shift mode has been selected (i.e., by the switch 106). If this determination is affirmative, the program advances to step 202 and this condition is indicated such as by displaying the message "Manual Shift Mode" at the display 70 (FIG. 1).

If the determination at step 200 in FIG. 8 is negative, the program advances to step 204 and the message "Automatic Shift Mode" is displayed. Subsequently, the program advances to step 206 and a flashing message "Shift to Neutral" is displayed. Thus, when the program is initiated from State 0, the controller first determines whether the manual shift mode or automatic shift mode is selected, and if the automatic shift mode is selected, the driver is requested to shift the transmission to the Neutral gear setting.

In step 208, the controller samples analog input (e.g. switch positions) from the driver through the shift control lever 20. In step 210, the controller determines whether the transmission is in the Neutral gear setting. If the transmission is in the Neutral gear setting, the program advances to State 2 (FIG. 9).

If the determination in step 210 is negative, the transmission is not in the Neutral position, and the program advances to step 212. In step 212, the controller determines whether a predetermined wait period has elapsed. If the predetermined wait period has not elapsed, the program advances to step 206 and the flashing message "Shift to Neutral" is displayed.

If the predetermined wait period has elapsed, the program advances to step 214 and the controller logs a fault. Subsequently, the program optionally advances to step 216, in which an audible alarm is sounded to warn the driver, before returning to step 206.

Figure 9:
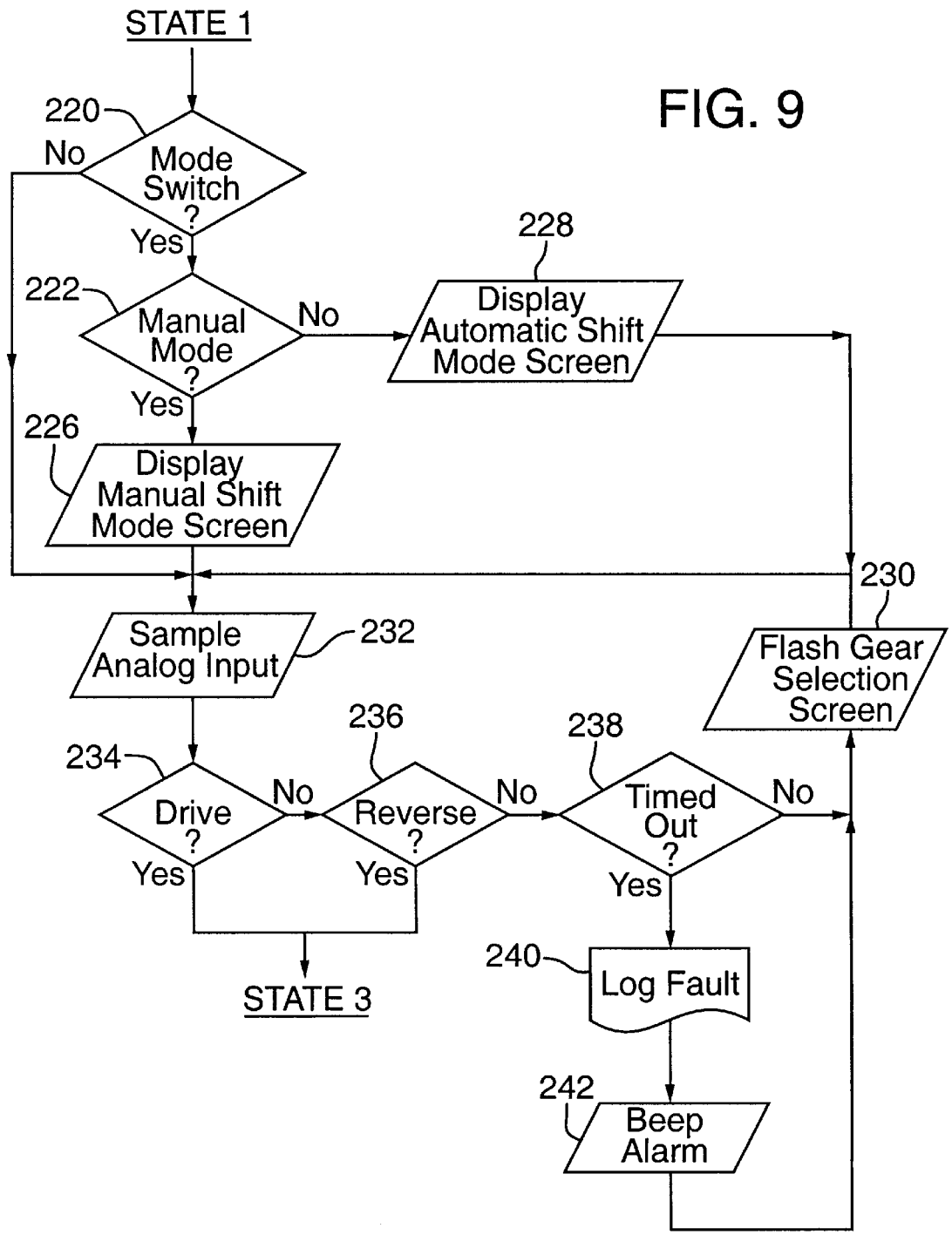

FIG. 9 shows the steps performed by the controller when in the State 1 operation. In step 220, the controller determines whether the mode switch 106 has been actuated. If the mode switch has not been actuated, the program advances to step 232.

If the mode switch has been actuated, the program advances to step 222. In step 222, the controller determines whether the manual shift mode is selected. If the manual shift mode is selected, the program advances to step 226. In step 226, the manual shift mode message is displayed.

If the manual shift mode is not selected, the program advances to step 228. In step 228, the automatic shift mode message is displayed.

In step 232, the controller samples an analog input signal from the shift control lever 20. In step 234, the controller determines if a forward Drive gear setting or mode is selected. If a forward Drive gear mode is selected, the program advances to State 3.

If a forward Drive gear setting is not selected, the program advances to step 236. In step 236, the controller determines whether a Reverse gear setting is selected. If a Reverse gear setting is selected, the program advances to State 3.

If a Reverse gear setting is not selected, the program advances to step 238. In step 238, the controller determines whether a predetermined wait period has elapsed. If the predetermined wait period has not elapsed, the program advances to step 230. In step 230, a gear selection screen is flashed on the display.

If the predetermined wait period has elapsed, the program advances to step 240. In step 240, the controller logs a fault. Subsequently, the program optionally advances to step 242, in which an audible alarm is sounded to warn the driver, before returning to step 230.

Figure 10:
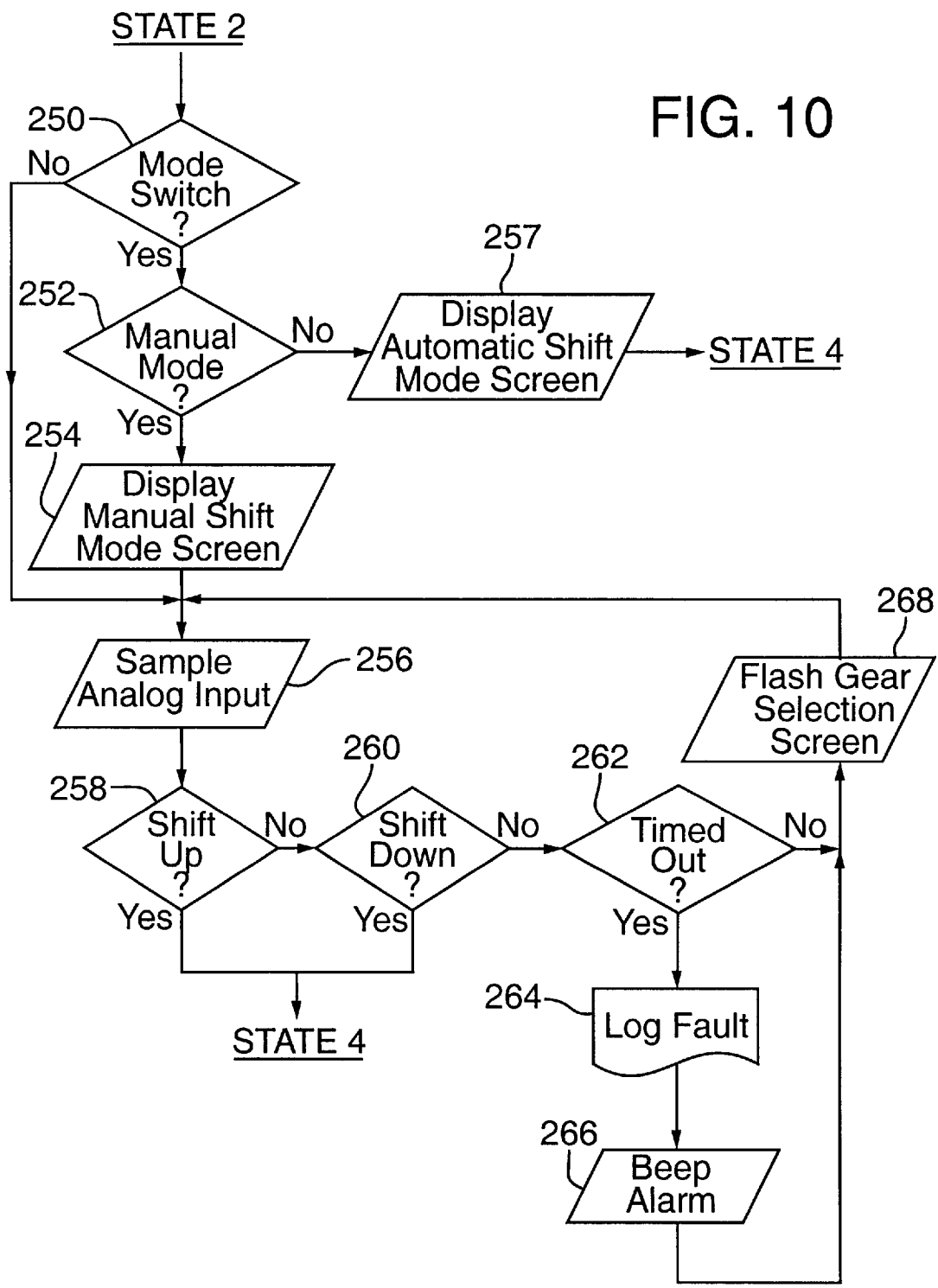

FIG. 10 shows the steps performed by the controller when in the State 2 operation. In step 250, the controller determines whether the mode switch has been actuated. If the mode switch has not been actuated, the program advances to step 256.

If the mode switch has been actuated, the program advances to step 252. In step 252, the controller determines whether the manual shift mode is selected. If the manual mode is selected, the program advances to step 254. In step 254, the manual shift mode message is displayed, and the program advances to step 256.

If the determination in step 252 is negative, the controller displays the automatic shift mode message, and the program advances to State 4.

In step 256, the controller samples analog inputs responsive to the driver actions available from the shift control lever 20. In step 258, the controller determines whether the driver has requested an upshift. If the driver has requested an upshift, the program advances to State 4.

If the driver has not requested an upshift, the program advances to step 260. In step 260, the controller determines whether the driver has requested a downshift. If the driver has requested a downshift, the state of the system moves to State 4.

If the driver has not requested a downshift, the program advances to step 262. In step 262, the controller determines whether the predetermined wait period has elapsed.

If the predetermined wait period has not elapsed, the program advances to step 268. In step 268, a flashing gear selection message is displayed.

If the predetermined wait period has elapsed, the program advances to step 264. In step 264, the controller logs a fault. Subsequently, the program optionally advances to step 266, in which an audible alarm is sounded to warn the driver, before returning to step 268.

Figure 11:
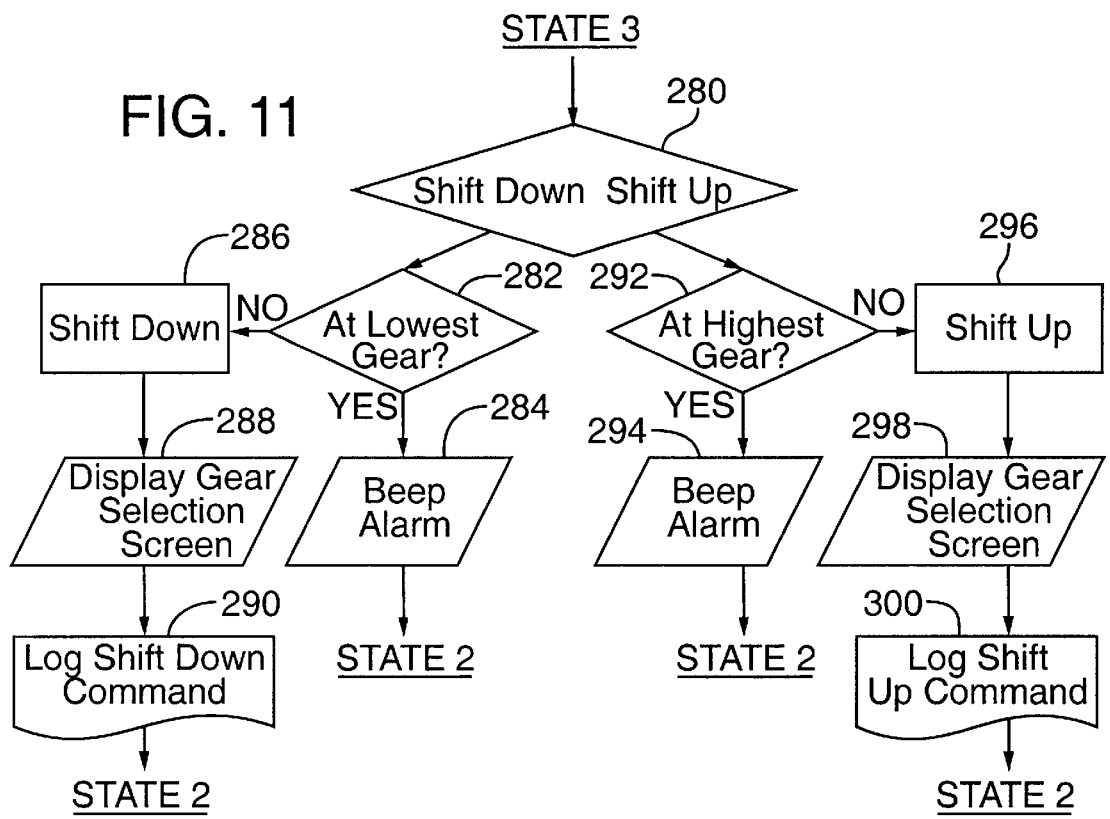

FIG. 11 shows the steps performed by the controller when in the State 3 operation. In step 280, the controller determines whether the driver requested an upshift or a downshift. If the driver requested a downshift, the program advances to step 282.

In step 282, the controller determines whether the transmission is in its lowest gear. If the transmission is in its lowest gear, the program optionally advances to step 284 and an audible alarm is sounded to warn the driver. Thereafter, the program returns to State 2.

If the determination in step 282 is negative, and the transmission is not in its lowest gear, the program advances to step 286. In step 286, the controller issues a downshift command. In step 288, a gear selection screen message is displayed (e.g., indicating the downshift). In step 290, the controller logs the downshift command, and the program returns to State 2.

If the driver requested an upshift in step 280, the program advances to step 292. In step 292, the controller determines whether the transmission is in its highest gear. If the transmission is in its highest gear, the program optionally advances to step 294 and an audible alarm is sounded to warn the driver. Thereafter, the program returns to State 2.

If the determination in step 292 is negative, the program advances to step 296. In step 296 the controller issues an upshift command. In step 298, a gear selection message is displayed. In step 300, the controller logs the upshift command and the program returns to State 2.

The above described logic can be modified as desired. For example, in State 3 following block 280 and before the respective blocks 282 and 292, queries can be made as to whether skip shifting has been requested (e.g., by two or more pulls on the shift lever within a predetermined time or by other actions of the shift lever). Also, logic can be included to prevent downshifting to the neutral position unless the mode switch is in neutral and the vehicle is traveling less than a predetermined speed, which may be varied by programming. Alternatively, the system may operate to allow the driver to shift into neutral whenever such action is requested by the driver, leaving it up to the driver to determine whether a Neutral shift is appropriate. Logic for operating the transmission when in the Reverse mode setting may also be included, with some transmissions having high and low Reverse speeds with, for example, the low Reverse speed being a default condition. Shifting may also be controlled in response to whether the mode selector is in the Park position. For example, when in Park, the system may treat the transmission as disabled until shifted to a Neutral position. Alternatively, when in Park or the vehicle is stopped, the transmission may shift to a default start gear position (e.g., a forward gear ratio of a desired level), with the forward gear ratio being changeable, such as by shifting the shift lever with the clutch then being depressed to establish a new default start gear position. A hold switch or mode may also be incorporated into the logic with the vehicle not shifting, for example, when the vehicle is in the automatic mode and a hold selector is actuated. These and other modes of operating logic may be implemented, as desired.

Figure 12:
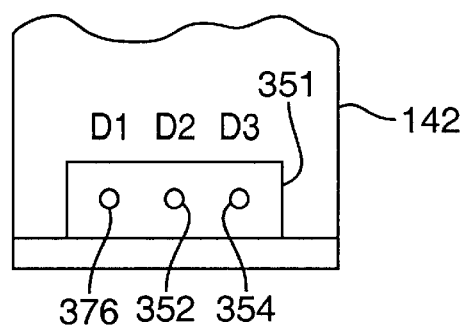
FIG. 12 is a broken away schematic view of an end portion of a shift control lever member showing an electrical connection block.

FIG. 12 illustrates a connector 142 (see also FIG. 6) having a three-pin connector block 351 with connections 376, 352 and 354, corresponding to nodes D1, D2 and D3, respectively. All information exchanged between the shift control lever 20 assembly and the other components of the system 10, particularly the transmission interface 40, may be confined to occur over the connections 376, 352 and 354. This connector provides an example of a universal form for connection of a wide variety of transmission types.

Figure 13:
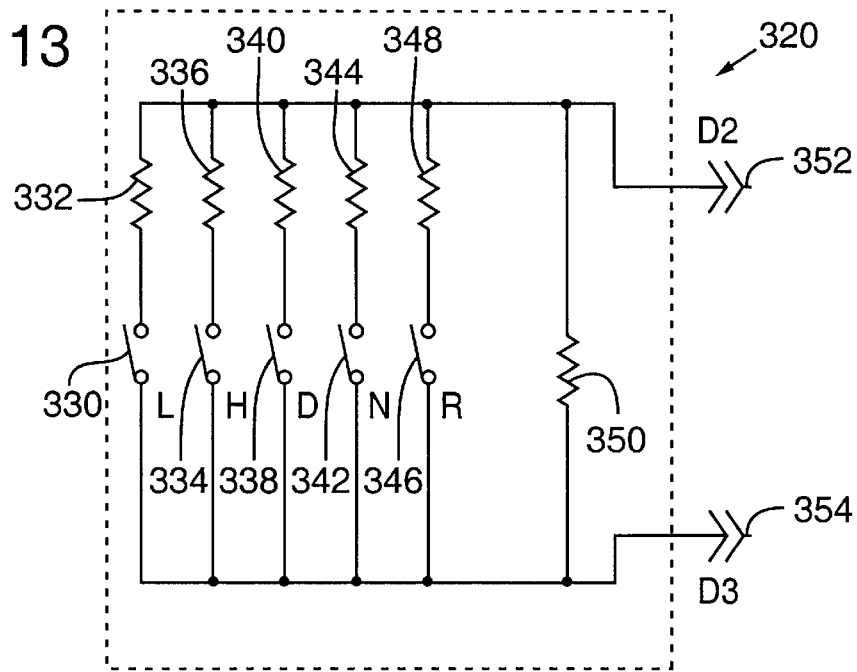
FIG. 13 is a circuit diagram showing a first resistive ladder circuit for an embodiment of a shift control lever assembly.

FIG. 13 shows one specific circuit for an embodiment of the shift control lever 20 designed for use with a transmission having Low Forward Drive (L), Hold (H), Forward Drive (D), Neutral (N) and Reverse (R) mode settings. In particular, FIG. 13 shows a resistive ladder 320 between the D2 node 352 and the D3 node 354. For each of the mode settings that can be selected, the resistive ladder 320 includes a switch for that mode setting connected in series with a resistor, with this switch and resistor connected between modes D2 and D3. In addition, a resistor 350 is connected between the D2 node and the D3 node in parallel with the respective branches containing the series connected switch and resistor. Specifically, the resistive ladder 320 in this example includes: a switch 330 in series with a resistor 332 for indicating the Low Drive mode setting, a switch 334 in series with a resistor 336 for indicating the Hold mode setting (if used to interrupt shifting, as explained above), a switch 338 in series with a resistor 340 for indicating the Drive mode setting, a switch 342 in series with a resistor 344 for indicating the Neutral mode setting, and a switch 346 in series with a resistor 348 for indicating the Reverse mode setting. The mode selector 112 in this embodiment may be used to operate the switches S1–S5. Alternatively, a separate selector may be used for controlling one or more of the switches (e.g., a separate hold switch). Also, fewer or more of these resistor/switch series branches may be included. For example, one may include a switch and resistor corresponding to the Park (P) mode selection. Thus, the illustrated circuit may readily be modified to accommodate various transmissions and logic requirements. The analog voltage output across modes D2, D3 provides a signal indicating the selected mode to the transmission ECU.

Figure 14:
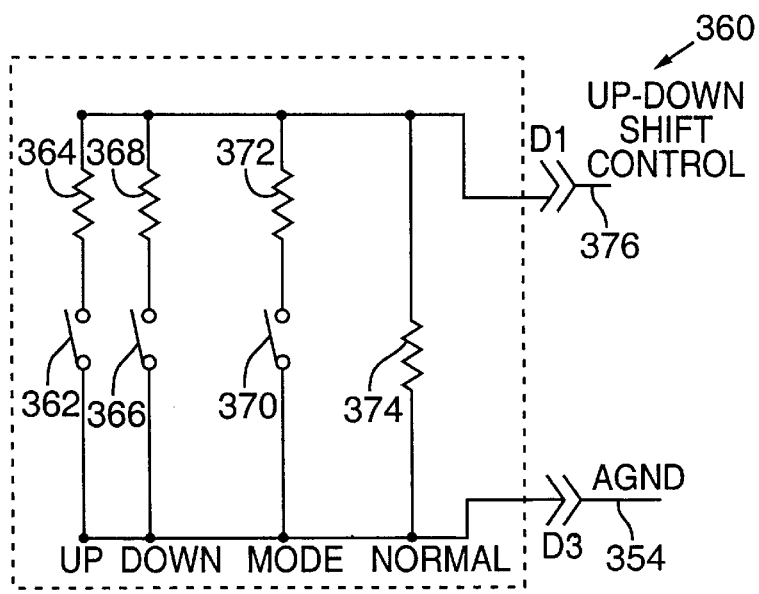
FIG. 14 is a circuit diagram showing a second resistive ladder circuit for the upshift/downshift and mode function of the shift control lever assembly of FIG. 13.

FIG. 14 shows an example of a circuit for an embodiment of the shift control lever 20 having a mode switch and the upshift/downshift functionality. In particular, FIG. 14 shows a resistive ladder 360 extending between the D1 node 376 and the D3 node 354. Between the D1 node 376 and the D3 node 354 are a plurality of branches containing a resistor in series with a switch, the branches being connected in parallel with another resistor 374. More specifically, the illustrated branches include a switch 362 for upshifts connected in series with a resistor 364; a switch 366 for downshifts connected in series with a resistor 368; and an optional switch 370 for selecting the automatic/manual mode which is connected in series with a resistor 372. Again the resistor 374 is connected in parallel with the branches. More or fewer branches may be included in the ladder 360. For example, a power/normal mode branch consisting of a switch and resistor may also be included. Also, in transmissions which allow only an automatic or a manual mode, the mode branch may be eliminated. The switches 362, 366 and 370 correspond, in this example, respectively, to switches 136, 137 and 106 in FIG. 5. The magnitude of the analog output voltage between notes D1 and D3 indicates which of the selector switches are closed. These signals are transmitted to or sampled by the transmission ECU. As another example, the hold switch branch in the FIG. 13 circuit may be positioned in the mode switch branch position in FIG. 14. For example, the manual mode in one Eaton transmission corresponds to the hold functionality. As another example, the L branch position may be replaced with a parking branch switch/resistor and the H branch position may then be the L branch.

Although variable, as a specific example, the resistor values may be assigned as follows: R332=2.29 ohms; R336= 1.23 ohms; R340=706 ohms; R344=392 ohms; R for a parking brake, if included, 5.42 ohms; R350=6.65 ohms; R364=383 ohms; R368=681 ohms; R372=1.15 ohms; and R374=11.5 ohms. Although other circuits may be utilized in the shift control lever 20, the illustrated resistive ladder circuits provide a simple circuit which may easily be modified to provide the appropriate outputs across nodes D2–D3 and D1–D3 for use with a wide variety of transmission types. In addition, a common circuit may be used for a variety of transmission types. In addition, in accordance with this disclosure, a single transmission selector mechanism may be used with a wide variety of transmissions. Alternative circuits may also be used, including circuits which produce individual outputs corresponding to the various shift and mode selections, although this would tend to complicate the circuit.

In view of the wide variety of embodiments to which the principles of our invention can be applied, it should be apparent that the embodiments are illustrative only and should not be taken as limiting the scope of our invention. We claim as our invention all such modifications as may come within the scope of the following claims and equivalents thereto.

What is claimed is:

1. An electronic shift control for providing signals indicating a vehicle driver's desired gear selection to a transmission controller which controls the transmission of the vehicle, the vehicle having a steering wheel supported by a steering column for steering the vehicle, the steering wheel projecting outwardly from the steering column for gripping by an operator of the vehicle for steering the vehicle, the shift control comprising:

an elongated lever element having a first end portion pivotally coupled to the steering column and a second or distal end portion spaced from the first end portion;

the lever element being pivotal in a first direction toward the steering wheel and in a second direction away from the steering wheel;

an electronic shift control circuit responsively coupled to the lever so as to provide a first signal in response to movement of the shift lever in the first direction and a second signal in response to movement of the shift lever in the second direction, one of the first and second signals indicating the driver's desire to up-shift the selected gear at least one gear shift level with the other of the first and second signals indicating the driver's desire to down-shift the gear selection at least one gear shift level.

2. An electronic shift control according to claim 1 wherein the first signal corresponds to upshifting the gear shift level and the second signal corresponds to downshifting the gear shift level whereby the distal end of the gear shift lever element is pulled toward the steering wheel to upshift the gear shift level and pushed away from the steering wheel to downshift the gear shift level.

3. An electronic shift control according to claim 1 including a mode selector mounted to the distal end portion of the lever element, the mode selector being movable between at least Drive, Neutral, and Reverse mode positions, the electronic shift control circuit providing signals to the transmission controller corresponding to the position in which the mode selector is in, a Drive position signal indicating the selection of a Forward Drive mode of transmission operation, a Neutral position signal indicating the selection of a Neutral mode transmission operation, and a Reverse position signal indicating selection of a Reverse mode of transmission operation.

4. An electronic shift control according to claim 3 in which the distal end portion of the lever includes a handle with a first surface facing toward the steering wheel, visual indicia being provided on the first surface to indicate positioning of the mode selector in the respective Drive, Neutral, and Reverse positions.

5. An electronic shift control according to claim 4 in which the transmission controller requires the mode selector to be in the Neutral position in order for the transmission to shift to Neutral.

6. An electronic shift control according to claim 5 in which the transmission controller requires the vehicle to be travelling at less than a predetermined speed in order for the vehicle to shift to Neutral with the mode selector in the Neutral position.

7. An electronic shift control according to claim 3 in which the mode selector comprises a switch which is positioned at the distal end of the lever element, the switch being movable in generally clockwise and counterclockwise directions relative to the steering wheel column between the mode positions.

8. An electronic shift control according to claim 7 including an auto/manual selector shiftable to a first manual position indicating position and to a second automatic position indicating position, the electronic shift control providing corresponding manual shift and automatic shift indicating signals which indicate to the transmission controller whether automatic or manual shifting is to occur.

9. An electronic shift control according to claim 1 in which the distal end portion of the lever element carries a mode selector shiftable between at least Park, Reverse, Neutral, Drive, and Low Drive positions, the electronic shift control circuit providing a signal indicating the mode selector position to thereby indicate to the transmission controller the driver's mode of transmission operation selected by the selector.

10. An electronic shift control according to claim 1 in which the steering wheel has an outer radius and wherein the lever element projects outwardly from the steering column to a position in which the distal end portion of the lever element is adjacent to and radially inwardly from the outer radius of the steering wheel.

11. An electronic shift control according to claim 10 wherein the steering wheel has at least one steering wheel opening therethrough, the distal end portion of the lever element being enlarged and having a first surface facing toward the steering wheel, the first surface being visible through the steering wheel opening, a mode selection switch carried by the distal end portion of the lever element and shiftable between at least Reverse, Neutral, and Drive positions, the electronic shift control providing a signal indicating the position of the mode selection switch, visual indicia being provided on the first surface indicative of the mode selected by the mode selection switch;

a manual/automatic selector facing the steering wheel from the first surface of the distal end portion of the lever element, the manual/automatic selector being shiftable to a first position corresponding to manual operation of the transmission and to a second position corresponding to automatic operation of the transmission, the electronic shift control providing an automatic shift mode indicator signal to the transmission controller when the manual/automatic switch is in the second position and a manual shift mode indicator signal to the transmission when the manual/automatic switch is in the first position, the transmission being responsive to the automatic mode indicator signal to automatically shift the vehicle between gears and to the manual indicator signal to respond to manual shifting of the vehicle by a driver utilizing the shift lever element; and the first surface of the distal end portion of the lever element also including visual indicia indicating whether the automatic/manual selector is in the first position or the second position.

12. An electronic shift control according to claim 1 including a mounting bracket connected to the steering column and supporting the lever element with the lever element thereby being coupled to the steering column by the mounting bracket, the mounting bracket including a base portion mounted to the steering column and a projecting shift lever supporting portion extending outwardly from the steering column from the base portion, the lever being pivotally mounted to the shift lever supporting portion.

13. An electronic shift control according to claim 12 in which the base portion comprises a collar which surrounds the steering column and wherein the shift lever supporting portion comprises a flange having a lever mounting surface extending in a plane generally parallel to a plane intersecting the upper surface of the steering wheel, the lever element being pivotal relative to the flange portion, the lever element having a neck portion projecting toward the steering wheel from the flange portion and a main lever section projecting outwardly from the neck portion and away from the steering column.

14. An electronic shift control lever assembly that provides signals indicating a driver's desired gear selection to a transmission controller for a transmission of a vehicle, the vehicle having a steering wheel supported by a steering column for steering the vehicle, the steering wheel having at least one steering wheel opening through which the driver of the vehicle may look, the shift control lever assembly comprising:

an elongated lever element coupled to and extending in an outward direction away from the steering column, the lever element having an outer end portion spaced from the steering column;

the outer end portion of the lever element being movable to at least first and second positions by the driver to respectively signal an upshift or downshift gear selection by the driver, the shift control lever assembly providing a signal to the transmission controller which indicates the position of the lever element and thereby whether the driver desires an upshift or a downshift;

the outer end portion of the lever including a mode selector movable between a plurality of positions to select a respective one of a plurality of transmission modes, the transmission mode corresponding to the position of the mode selector, the shift control lever assembly providing signals to the transmission controller indicating the transmission mode of the mode selector;

the outer end portion of the lever including a first surface exposed to the driver through the steering wheel opening; and visual indicia on the first surface indicative of the position of the mode selector, the visual indicia being viewable by the driver through the steering wheel opening.

15. An electronic shift control lever assembly that provides signals indicating a driver's desired gear selection to a transmission controller for a transmission of a vehicle, the vehicle having a steering wheel supported by a steering column for steering the vehicle, the shift control lever assembly comprising:

a lever mounting bracket including a base portion and a lever supporting portion, the base portion comprising a collar mounted to the steering column and surrounding the steering column, a lever supporting portion projecting outwardly from the collar and away from the steering column;

a lever pivotally coupled to the lever supporting portion and extending in an outward direction away from the steering column; and the lever being pivoted relative to the lever supporting portion to at least first and second positions, such pivoting movement being accomplished by the driver to signal a gear selection.

16. An electronic shift control lever assembly that provides signals indicating a driver's desired gear selection to a transmission controller for a transmission of a vehicle, the vehicle having a steering wheel supported by a steering column for steering the vehicle, the shift control lever assembly comprising:

a lever element coupled to and extending in an outward direction away from the steering column, the lever element having an outer end portion spaced from the steering column;

the outer end portion of the lever element being movable by a driver from a first position to at least a gear upshift indicating position and a gear downshift indicating position, to thereby signal a gear selection;

a signal generating circuit coupled to the lever element and operable to provide signals indicative of the lever element position, such signals being made available to the transmission controller of the vehicle; and the outer end portion of the lever element being positioned within reach of the driver's fingertips while the driver's hands are in contact with the steering wheel such that the outer end portion is movable by the driver from said first position to the gear upshift and downshift indicating positions while the driver's hands are in contact with the steering wheel.

17. An electronic shift control lever assembly according to claim 16, wherein the shift control lever is pivotally coupled to the steering column and wherein the outer end portion of the lever is biased to return to the first position following movement of the outer end portion of the lever to either of said upshift or downshift positions.

18. An electronic shift control lever assembly according to claim 16 wherein the upshift position is toward the driver and the downshift position is away from the driver, and wherein the first position is farther from the driver than the upshift position and closer to the driver than the downshift position.

19. An electronic shift control lever assembly according to claim 16 wherein the outer end portion of the lever carries a manually actuated automatic/manual mode selector in a position facing the driver, the manual/automatic mode selector being actuatable by the driver to switch between an automatic shift mode position and a manual shift mode position, the signal generating circuit providing a signal to the transmission controller corresponding to the position of the automatic/manual mode selector.

20. The shift control lever assembly of claim 19 wherein the lever element has a longitudinal axis and wherein the automatic/manual mode selector comprises a slide switch actuatable in a direction approximately coaxial with the longitudinal axis of the lever element.

21. The shift control lever assembly of claim 19 wherein the steering wheel has a rim having an upper surface that is generally in a plane, and wherein the outer end portion of the lever includes a mode selector movable in a plane approximately parallel to the steering wheel plane to select one of a plurality of transmission modes, the signal generating circuit providing a signal to the transmission controller indicating the transition mode selected by the mode selector, the transmission modes including at least Neutral, Drive and Reverse transmission modes.

22. The shift control lever assembly of claim 21 wherein the outer end portion of the lever element includes an arcuately shaped end, the mode selector being movable in an arcuate path along the arcuate end.

23. The shift control lever assembly of claim 16 in which the signal generating circuit comprises at least one resistive ladder.

24. The shift control lever assembly of claim 23 including an output connector with a plurality of output nodes, the resistive ladder being modifiable without requiring a change in the number of output nodes to provide output signals required to control a plurality of types of transmissions.

25. The shift control lever assembly of claim 16 including a display within the driver's view, the display providing visual representations of at least some of the signals being transmitted by the shift control lever assembly to the transmission controller.

26. The shift control lever assembly of claim 19 wherein the signal generating circuit provides analog electrical signals to the transmission controller.

* * * * *

Disclaimer 6,151,977—Paul Menig, Tigard; Michael von Mayenburg; Nasser Zamani, both of Lake Oswego; Joseph Loczi; Jason Stanford, both of Portland, all of Oregon. LEVER ASSEMBLY FOR AN ELECTRONICALLY CONTROLLABLE VEHICLE TRANSMISSION. Patent dated November 28, 2000. Disclaimer filed December 18, 2001, by assignee, Freightliner Corporation.

Hereby enters this disclaimer to claims 13 and 22.

*(Official Gazette, May 7, 2002)*